US012334111B2

(12) United States Patent
Peer et al.

(10) Patent No.: US 12,334,111 B2
(45) Date of Patent: Jun. 17, 2025

(54) REDACTING VIDEOS AND IMAGES TO REDUCE PTSD AND OTHER NEGATIVE EFFECTS ON REVIEWERS

(71) Applicant: NETSPARK LTD., Giva't Shmu'el (IL)

(72) Inventors: Yariv Peer, Giva't Shmu'el (IL); Elyasaf Korenwaitz, Elon More (IL)

(*) Notice: Subject to any disclaimer, the term of this patent is extended or adjusted under 35 U.S.C. 154(b) by 127 days.

(21) Appl. No.: 18/022,545

(22) PCT Filed: Dec. 9, 2021

(86) PCT No.: PCT/IL2021/051471
§ 371 (c)(1),
(2) Date: Feb. 22, 2023

(87) PCT Pub. No.: WO2022/130373
PCT Pub. Date: Jun. 23, 2022

(65) Prior Publication Data
US 2023/0317114 A1    Oct. 5, 2023

Related U.S. Application Data

(60) Provisional application No. 63/128,107, filed on Dec. 20, 2020.

(51) Int. Cl.
*G11B 27/02*      (2006.01)
(52) U.S. Cl.
CPC .................................. *G11B 27/02* (2013.01)

(58) Field of Classification Search
CPC ...... G06V 20/46; G06V 40/178; G06V 40/10; G06V 40/161; G06V 10/764;
(Continued)

(56) References Cited

U.S. PATENT DOCUMENTS 8,949,878 B2 * 2/2015 Dimitrova .......... H04N 21/4542
725/28
10,127,195 B2   11/2018 Bliss et al.
(Continued)

OTHER PUBLICATIONS

Dubberley, Sam, "Tips for Viewing and Verifying Potentially Distressing Open-source Information", in Amnesty International—Citizen Evidence Lab website, Dec. 10, 2019. https://citizenevidence.org/2019/12/10/tips-for-viewing-and-verifying-potentially-%20distressing-open-source-information/.
(Continued)

*Primary Examiner* — Thai Q Tran
*Assistant Examiner* — Nienru Yang

(57) ABSTRACT

An aspect of the current invention relates to a method to reduce the emotional impact on a viewer while allowing evaluation of graphic pornographic, pedophilic and/or violent content. In some embodiments the system has various functions that reduce the emotional impact and/or stress inducing factors of a media (e.g., an image and/or a video). For example, the functions may include changing and/or blurring certain parts of the image and/or changing the color and/or contrast of the image and/or presenting part of the media while withholding other parts and/or changing the media in different ways when it is repeatedly presented e.g., to reduce the effect of repeated seeing same distressing content.

24 Claims, 11 Drawing Sheets

(58) Field of Classification Search
CPC .......... H04N 21/4318; H04N 21/4756; H04N 21/251; H04N 21/23418; G11B 27/02; G11B 27/022; G11B 27/031
USPC ........................................................ 386/285
See application file for complete search history.

(56) References Cited

U.S. PATENT DOCUMENTS

| | | | |
|---|---|---|---|
| 10,419,790 B2* | 9/2019 | Gersten | H04N 21/454 |
| 10,475,145 B1* | 11/2019 | Lester | G06T 7/11 |
| 2009/0049484 A1* | 2/2009 | Conter | H04N 21/4751 |
| | | | 348/576 |
| 2015/0070516 A1 | 3/2015 | Shoemake et al. | |
| 2016/0239718 A1 | 8/2016 | Korenwaitz et al. | |
| 2020/0366959 A1* | 11/2020 | Pau | G06N 20/00 |

OTHER PUBLICATIONS

Ottaway, Amanda, "Tension at Raniere Trial as Child-Porn Evidence Shown to Jury", in Courthouse News Service website, Jun. 13, 2019. https://www.courthousenews.com/tension-at-raniere-trial-as-child-porn-evidence-shown-to-jury/.

"Working with Traumatic Imagery", in Dart Center for Journalism and Trauma website, Columbia Journalism School, Aug. 12, 2014. https://dartcenter.org/content/working-with-traumatic-imagery.

Anthony Feinstein,Blair Audet and Elizabeth Waknine, "Witnessing images of extreme violence: a psychological study of journalists in the newsroom", in National Library of Medicine—National Center for Biotechnology Information, Jul. 8, 2014. https://www.ncbi.nlm.nih.gov/pmc/articles/PMC4100239/.

Brian L. Huchel, Purdue University, "Trauma therapy for police officers dealing with child pornography, cyberdeviance", in Medical Xpress, Oct. 2, 2018. https://medicalxpress.com/news/2018-10-trauma-therapy-police-officers-child.html.

* cited by examiner

REDACTING VIDEOS AND IMAGES TO REDUCE PTSD AND OTHER NEGATIVE EFFECTS ON REVIEWERS

RELATED APPLICATION/S

This application claims the benefit of priority under 35 USC § 119(e) of U.S. Provisional Patent Application No. 63/128,107 filed 20 Dec. 2020, the contents of which are incorporated herein by reference in their entirety.

FIELD AND BACKGROUND OF THE INVENTION

The present invention, in some embodiments thereof, relates to protecting people exposed to damaging image and/or video content and more particularly but not exclusively to reduce damage to humans involved in analyzing pornographic, pedophilic, and/or violent images.

Anthony Feinstein et al., 2013, Journal of the Royal Society of Medicine Open; 5(8) 1-7 DOI: 10.1177/2054270414533323 observed, "frequent (i.e., daily) exposure to violent images independently predicted higher scores on all indices of the Impact of Event Scale-revised, the BDI-II and the somatic and anxiety subscales of the GHQ-28 . . . frequency rather than duration of exposure to images of graphic violence is more emotionally distressing to journalists working with User Generated Content material. Given that good journalism depends on healthy journalists, news organizations will need to look anew at what can be done to offset the risks inherent in viewing User Generated Content material. Our findings, in need of replication, suggest that reducing the frequency of exposure may be one way to go."

AMANDA OTTAWAY Jun. 13, 2019 reported in Courthouse News Service that, "No one provided a verbal record of the images or indicated who appeared in them, though the indictment charges Raniere with sexual exploitation . . . . The jury consists of eight men and four women, plus four alternates. While usually inscrutable, some on the panel appeared moved, even pained, as Rees flipped through the binder."

In the book Digital Witness, Dubberley, Satterthwaite, Knuckey, and Brown (Oxford University Press Jan. 17, 2020, ISBN: 9780198836070 note that: "The considerable risk of psychological distress through secondary experiences of potentially traumatic events has been under-addressed in the human rights field for various reasons. These include the relative recency in which viewing traumatic photos and video has been incorporated in the definition of Post-Traumatic Stress Disorder (PTSD); the generally poor response of the human rights field to the mental health risks of advocacy; and the far more rapid growth of fact-finding with online and digital content compared to the strategies designed to counter its ill-effects."

The Citizen Evidence Lab of Amnesty International published in Dec. 10, 2019 in a manual called Tips for Viewing and Verifying Potentially Distressing Open-source Information, 'Interviewees in Making Secondary Trauma a Primary Issue raised the varied mechanisms they used to cope after viewing distressing eyewitness media. While in the office, these included: "Keeping open a window showing a Tumblr feed of cute dogs", "Checking out Taylor Swift's Instagram feed", "Getting out of the office for a walk and a chat to a friend". The coping mechanisms were varied—but worked for each individual interviewee.'

In their article, Working with Traumatic Imagery Aug. 12, 2014, (Trustees of the Columbia University, NY) the Dart Media Center note that, "Photographs and video of horrifying, violent acts may provide essential documentation of human tragedy, but however compelling its news value, traumatic imagery needs to be handled with care, as it can place the wellbeing of those who work with it at risk." They appear to disclose, "six practical things media workers can do to reduce the trauma load".

In his article, Trauma therapy for police officers dealing with child pornography, cyberdeviance, Oct. 2 2018, MedicalXPress, Purdue University Brian Huchel, appears to disclose, "Seigfried-Spellar, an assistant professor in Purdue Polytechnic Institute's Department of Computer and Information Technology, researches how examiners who have to see thousands of child pornography images every day deal with that kind of job. She looks at the resulting problems, ranging from stress and depression, to secondary traumatic stress disorder and suicidal thoughts."

Paris Goodyear-Brown, in the book, *Handbook of Child Sexual Abuse: Identification, Assessment, and Treatment*, John Wiley & Sons, 9 Sep. 2011 observes, "MOsht assist an abused child are tasked with responding to allegations of child sexual abuse, and thus will be exposed repeatedly to variations of the same scenario with numerous survivors over their career. Hearing the abuse each child endured may cause secondary trauma, prompting symptoms of avoidance, hyperarousal and intrusive recollections . . . continual exposure to survivors' traumatic material, with no evidence of resolution may result in distortions in the helper's worldview." Goodyear-Brown reports that it is posited that traumatic stress syndrome, "would be less likely to occur where such connectedness is neither sought nor achieved" He also suggests that "increased perceptions of autonomy" would decrease stress and burn out.

Additional background art includes Sam Dubberly, Elizabeth Griffin, Haluk Met Bal, *Digital Witness Using Open Source Information for Human Rights Investigation, Documentation, and Accountability*, Oxford University Press 2019; Sam Dubberly, Elizabeth Griffin, Haluk Met Bal, Eyewitness Media Hub, Open Society Foundations, Making Secondary Trauma a Primary Issue: A Study of Eyewitness Media and Vicarious Trauma on the Digital Frontline, 2020. Juliane A. Kloess, Jessica Woodhams, Helen Whittle, Tim Grant, Catherine E. Hamilton-Giachritsis; The Challenges of Identifying and Classifying Child Sexual Abuse Material, Sexual Abuse 2019, Vol. 31(2) 173-196

SUMMARY OF THE INVENTION

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

According to an aspect of some embodiments of the invention, there is provided a method for protecting a viewer of distressing content including: presenting the content by default masked.

According to some embodiments of the invention, the method further includes: presenting the content by default with sound separate from images.

According to some embodiments of the invention, the method further includes: providing a tool for a user to increase a resolution of a portion of the content.

According to some embodiments of the invention, the method further includes: providing an automatic function to estimate an age of a person in an image According to some embodiments of the invention, the method further includes: providing an automatic function to identify anachronistic aspects of an image.

According to some embodiments of the invention, the anachronistic aspect includes a body organ that is out of scale with relation to other parts of a body.

According to some embodiments of the invention, the anachronistic aspect includes a change in a person in different portions of the media.

According to some embodiments of the invention, the method further includes: providing an automatic function to mask only faces an image.

According to some embodiments of the invention, the method further includes: providing an automatic function to mask everything except faces an image.

According to some embodiments of the invention, the method further includes: providing an automatic function to mask everything except a particular person in the media.

According to some embodiments of the invention, the method further includes: providing an automatic function to mask everything except a relationship between a pair of persons in the media.

According to some embodiments of the invention, the method further includes: providing an automatic function to mask details not flagged as ambiguous in the media.

According to some embodiments of the invention, the method further includes: providing an automatic function to mask details flagged as already classified in the media.

According to some embodiments of the invention, the method further includes: providing an automatic function to recognized an object of focus of a portion of the media.

According to some embodiments of the invention, the method where presenting content masked includes at least one of changing a color, presenting an image in black and white, increasing contrast, decreasing contrast, presenting an object as an outline, reducing resolution, blurring cropping is space, cropping in time, replacing with a neutral object, replacing with an object that changes when the scene is repeated.

According to some embodiments of the invention, the method further includes: providing an automatic function to mask nudity.

According to some embodiments of the invention, the method further includes: providing an automatic function to mask everything except nudity.

According to some embodiments of the invention, the method further includes: providing an automatic function to mask expressions of distress.

According to some embodiments of the invention, the method further includes: providing an automatic function to mask everything except expressions of distress.

According to some embodiments of the invention, the method further includes: providing an interface for classifying portions of the media.

According to some embodiments of the invention, the method further includes: wherein the classifying includes at one of the categories distressing content, dangerous content, violence, erotic content, pedophilia, ambiguous, need to review.

According to some embodiments of the invention, the method further includes: providing an interface for automatically presenting portions of the media that relate to an age on one or more people.

According to some embodiments of the invention, different masking is applied to different portions of a media.

According to some embodiments of the invention, skin is masked differently from other portions of the media.

According to some embodiments of the invention, children are masked differently from other people.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) and/or a mesh network (meshnet, emesh) and/or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

Data and/or program code may be accessed and/or shared over a network, for example the Internet. For example, data may be shared and/or accessed using a social network. A processor may include remote processing capabilities for example available over a network (e.g., the Internet). For example, resources may be accessed via cloud computing. The term "cloud computing" refers to the use of computational resources that are available remotely over a public network, such as the internet, and that may be provided for example at a low cost and/or on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and PGP, which are well known in the industry.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the Drawings.

DESCRIPTION OF SPECIFIC EMBODIMENTS OF THE INVENTION

Figure 1:
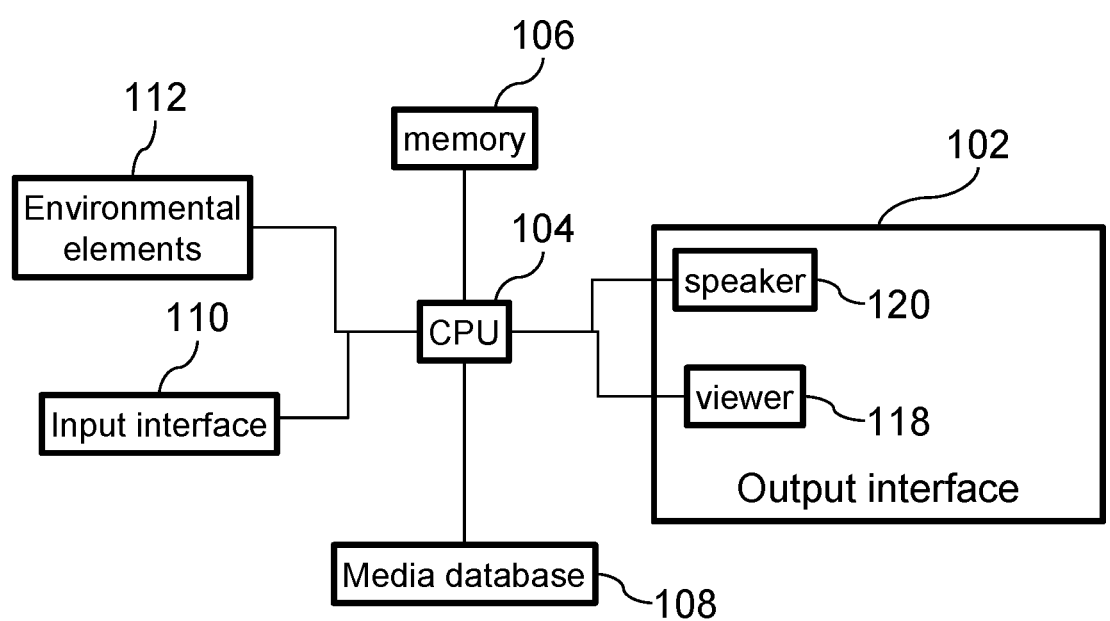
FIG. 1 is a block diagram of a system for protecting a reviewer of media in accordance with an embodiment of the current invention.

The present invention, in some embodiments thereof, relates to protecting people exposed to damaging image and/or video content and more particularly but not exclusively to reduce damage to humans involved in analyzing pornographic, pedophilic, and/or violent images.

Overview

A significant number of people are involved in legitimate tasks that expose them to pornographic, pedophilic, violent and/or otherwise objectionable imagery. Repeated exposure can have harmful effects. For example, there have been reports of PTSD and other effects to police officers investigating violent sexual crimes and/or pornography. People affected by these problems may include Internet watchdogs; lawyers, judges, juries and/or witnesses involved in investigating and/or prosecuting violent sexual crimes; reporters reporting on crime and/or war. For example, while developing a data base for training artificial intelligence routines to detect illegal Internet images and/or videos, the current inventor found that staff members involved in the classification process reported harmful effects of their work. In the hope of helping his staff members and others suffering from similar work, the current inventor has developed as system to reduce the negative effects of this kind of content.

An aspect of the current invention relates to a method to reduce the emotional impact on a viewer while allowing evaluation of graphic pornographic, pedophilic and/or violent content. In some embodiments the system has various functions that reduce the emotional impact and/or stress inducing factors of a media (e.g., an image and/or a video). For example, the functions may include changing and/or blurring certain parts of the image and/or changing the color and/or contrast of the image and/or presenting part of the media while withholding other parts and/or changing the media in different ways when it is repeatedly presented e.g., to reduce the effect of repeated seeing same distressing content.

In some embodiments, the system may include tools to reduce exposure, for example by organize viewing of the content to facilitate decision making while limiting exposure. For example, the system may include a comment area where a user may keep track of what issues have been determined and what issues need to be determined and/or where in the media (e.g., where in a picture and/or what frame of a video) contains ambiguity and/or significant unsolved issues. The system may include tools to view the ambiguous portion of the media isolated from the rest of the content. While the application is described herein mostly in relation to viewing images, similar tools may be used to investigate details of sounds and/or action and/or other media and/or a combination thereof which allow an investigator to focus on important details while being shielded from the full emotional impact of the material. The tools may also be used for other purposes, for example investigations of violence, pornography, human trafficking.

In some embodiments, the system may include tools to recognize important details of the content without viewing and/or with reduced viewing. For example, the system may include automatic tools to determine various factors helping to identify the age of a subject (e.g., facial features, relative size of body organs, muscle and fat content etc.). For example, the system may include tools to recognize anachronistic aspects of a subject (facial features indicate a different age from body features). For example, the system may include tools to find certain important subjects and/or interactions between important subjects in the media without requiring a human user repeatedly being exposed to other disturbing aspects of the media.

In some embodiments, the system may include tools to change the background of a scene and/or parts of a scene that are not being investigated to reduce effected of repeated exposure to the scene.

In some embodiments, a system may include tools to monitor and/or reduce stress for example, the system may monitor a user's actions, report dangerous practices and/or recommend corrections. For example, a user and/or a supervisor may be warned when a user has viewed a distressing scene many times and/or is running a distressing video on repeat mode and/or leaving a distressing picture open on his desktop and/or working long hours on distressing material without a break. Optionally the system will recommend and/or provide distracting materials periodically and/or test a user's stress levels and/or recommend an intervention to peers and/or supervisors.

In some embodiments, all or part of media may be masked. Masking a portion of a media may include various aspects. For example, a section of sound or a portion of an image may be completely blocked and/or replaced by alternative content. Optionally, the alternative content may be selected to reduce the impact of the disturbing content and/or may change over time and/or may be changed on repeated viewings of the scene. Alternatively or additionally, masking may reduce impact of the masked content while allowing a reviewer to determine what is the content. For example, masking may include reducing contrast (e.g., presenting a washed-out image and/or reducing the volume of loud sounds). For example, masking may include reducing resolution and/or changing colors and/or various artistic effects (for example, changing images to outlines, sketches and/or reducing the realism of the images and/or the size thereof. Different forms of masking may be applied to different parts of a media sequentially and/or simultaneously. For example, one mask may be applied to skin in an image (for example raising contrast and/or changing color and/or emphasizing edges) and/or another mask may be applied to a background of the image (for example, reducing contrast and/or blurring) and/or another mask may be applied to faces etc.

In some embodiments, during viewing and/or after viewing a user may change the level and/or kind of masking of part of the media. These changes may be temporary and/or remain until the user actively returns to different settings. For example, a user may select an area of the screen to reduce masking, e.g., in order to see more clearly what is occurring in that area. Optionally, when the user moves the pointing device and/or lets go of the selection switch to return masking. For example, there may be a tool bar with symbols for different parts of the image [e.g. faces, skin, background, the entire image, areas of focus, background, people in minimal dress, people in full dress] and/or different kinds of masking [e.g. change contrast, change resolution, change color, emphasize edges, add special effects such as sketching effects etc.] and/or different selection options such that the user can move a point over a tool to temporarily change that masking setting and/or click the tool to toggle the masking setting and/or right click to change detailed options for the setting etc. Optionally, the user may toggle a certain setting and/or apply a change in the setting to a selected area of an image. Optionally more sophisticated options may be available, for example, applying a certain type of masking specifically to the faces of children and/or to the skin of children and/or to children and adults who are interacting with the children and/or the opposite, applying a certain masking to parts of the image that do not include children (e.g., this may reduce the impact of screening a lot of legal pornographic and/or violent material for pedophilia). In some embodiments, a viewer may have limited control over the masking. For example, some viewers may not be able to remove certain aspects of the masking and/or may need to obtain special permission to remove certain aspects of the masking from certain portions of the media.

In some cases, a reviewer (e.g., a witness, a judge, a jury) may be shown certain parts of the media without any masking in order to facilitate testimony. For example, after the media has been screened and pertinent portions have been selected, the reviewer may be exposed only to those pertinent portions, reducing the impact while retaining the ability to testify.

EXEMPLARY EMBODIMENTS

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a block diagram of a system for protecting a reviewer of media in accordance with an embodiment of the current invention. In some embodiments, a system includes a speaker 120 and/or an output interface 102 (e.g., a viewer 118 screen and/or a speaker 120) configured for presenting a media to a user. Additionally or alternatively, the system includes a processor 104 connected to memory 106 and/or a media database 108. For example, the memory 106 may store program instructions for marking media stored in the media database 108 and/or for modifying the presentation of the media. Optionally, the processor outputs the markings and/or the modified presentation to a user. In some embodiments, an input interface 110 may be configured to facilitate the user navigating through the media, viewing particular parts of the media and/or modifying the presentation of those parts of the media and/or adding further markings. Additionally or alternatively, multiple reviewers may have access to the media database 108. For example, this may facilitate a reviewer sharing markings and/or views of a media, for example, for requesting and/or receiving advice on how to judge the media and/or a portion thereof.

In some embodiments, marking the portions of the media (for example, a portion may include a time range from a video and/or portion of an image). Markings may include judgements (for example including classifying the media and/or a portion thereof with one or more of erotic, pornographic, violent, involving a child, involving only adults, involving relationships between an adult and a child, involving one or more particular characters, involving nudity, involving suggestive postures, involving suggestive clothing, unjustified nudity etc.). Optionally, a marking (for example any of the above) may also include a comment. For example, a comment may include one or more of needs more clarification, ambiguous, definite, need not view again, need to view again etc. Optionally, the user interface 110 will allow viewing of selected marked portions and/or masking of selected marked portions and/or masking of non-marked portions. For example, the user interface 110 will facilitate focusing in on particular portions of the media without being exposed to other portions. Optionally, there may be default settings for various forms of masking and/or for masking of various parts of the media. For example, there may be different default settings for different applications. For example, there may be one set of default settings for witnesses another for people screening media to classify it (for example as legal, illegal etc.), another for reporters another for editors etc.

Optionally the system includes one or more options to reduce the emotional impact of a media when viewing the media. For example, the media may be presented with reduced contrast (e.g., reduced contrast images and/or sound with a reduced volume range) and/or increased contrast and/or without sound and/or without images and/or with reduced resolution images and/or with image having certain body parts (e.g., faces, sexual organs) masked (optionally the masking will include an identification [e.g., a name or number]e.g., facilitating the viewer to identify people without exposing their faces). Optionally, images may be reduced to black and white, grayscale, sketches (e.g., outlines) or the like. Alternatively or additionally, colors may be altered and/or backgrounds may be changed. For example, the changes in media when it is repeated may reduce damage of repeated viewing of distressing material. the and/or periodic viewing breaks may be made. Optionally, during viewing breaks, distracting materials and/or tests of fatigue may be presented. In some embodiments, the system may suggest that a user take a break and/or speak to a coworker and/or supervisor and/or therapist. Alternatively or additionally, the system may report (for example, viewing statistics) to a co-worker, a supervisor and/or a therapist and/or suggest to that they contact the user. For example, masking may be used on features that encourage empathy and/or strong connection to a subject that may increase the traumatic stress.

In some embodiments, a system to reduce impact of media viewing may suggest and/or actuate changes in a viewing environment 112. For example, opening windows, changing temperatures, increasing decreasing light, adding background noise etc. Optionally, the system (for example, the input interface 110, and/or output interface 102 and/or viewer 118 and/or the environment 112) will be designed to increase the user's feeling of control e.g., the viewer 118 may include a window kept visible with information about the clip and/or the processing settings for example, to help the user feel informed and/or the user interface 110 may use common language (e.g., avoiding technical terms which make a user feel stifled) and/or the user interface 110, 102 may have clearly marked back and/or undo functions and/or the user interface 102, 110 may be designed with clear unthreatening error messages and/or queries and/or the user interface 102, 110 may include easily retrievable labels and/or control markers and/or the user interface 102, 110 may be designed for easy comprehension without too many words and/or symbols. Optionally, the system (e.g., the viewer 118 and/or interface 102) is designed to inhibit full screen images and/or full screen video viewing.

Figure 2:
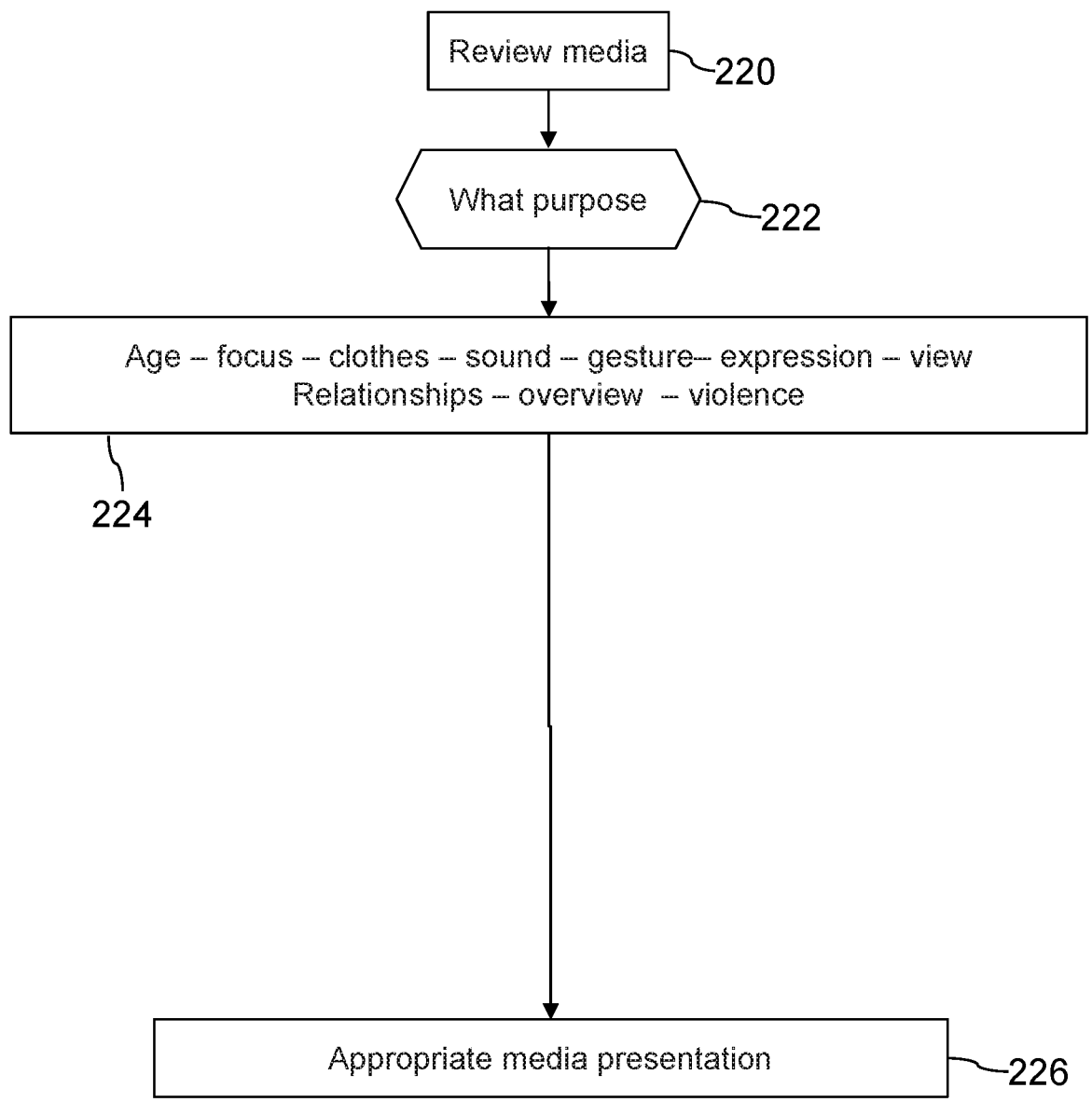
FIG. 2 is a flow chart illustrating a method of reviewing content with reduced emotional impact in accordance with an embodiment of the current invention.

FIG. 2 is a flow chart illustrating a method of reviewing 220 content with reduced emotional impact in accordance with an embodiment of the current invention. In some embodiments, a viewing system may include various setting and/or pre-programmed settings and/or tools to assist in reviewing a media object while reducing the emotional impact thereof. For example, a user may specify 222 what is the current purpose 224 of viewing the material. Optionally, the system may then automatically select appropriate 226 portions of the media, apply tools and/or modify a presentation of the media to facilitate achieve the objectives with reduced impact. Examples of some possible ways of adjusting viewing are presented in various examples below. For example, a reviewer may first overview the media (for example using automated tools and/or viewing at a reduced impact (for example as illustrated in FIG. 3)). In the overview the issues and sections that need to be further reviewed and/or clarification may be determined and/or marked. The reviewer may then view the necessary portions of the media and/or may view these portions with specialized tools and/or views facilitating clarifying the desired issue may be used on only parts of the media (e.g., using the user's classification and/or automatic tools to choose the pertinent portions to view) and/or without exposure to the full impact of the various scenes being reviewed (for example, masking non-pertinent portions of an image etc.).

In some embodiments, a user may review a video in order to determine the age of a character therein. For example, the emphasize characteristics that are used to determine age and/or hide characteristics that are not useful in determining age of that character (e.g., other characters, clothes etc.). For example, a viewer may be trying to figure out what is the focus of a section of a video. Similarly, the system may be used to view the video determine clothing, sounds, gestures, expressions, background, relationships, violence. For example, the system may emphasize aspects that are useful for the task at hand and/or deemphasize (e.g., mask) other aspects.

Figure 3A:
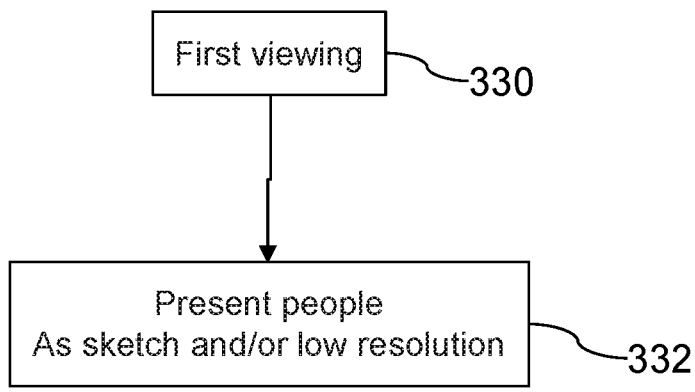
FIGS. 3A and 3B are illustrations of a reducing impact of reviewed content in accordance with an embodiment of the current invention.
Figure 3B:
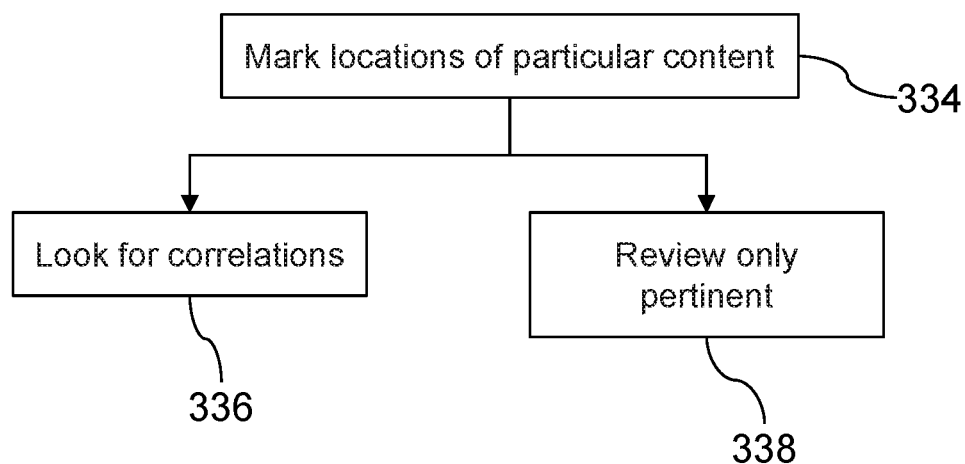

FIGS. 3A and 3B are illustrations of a reducing impact of reviewed content in accordance with an embodiment of the current invention. For example, in some embodiments, when a reviewer is initially overviewing 330 a media, various changes may be made to reduce the impact. For example, contrast of images and/or sound may be increased and/or decreased significantly. For example, resolution images and/or quality of sound may be reduced. For example, images may be stylized and/or made less realistic. For example, images may be reduced to outlines and/or made into sketches and/or colors may be changes and/or reduced to grayscale. For example, an overview 330 mode may be of reduced impact (e.g., as sketches 332 and/or low resolution) allowing a reviewer to categorize obvious media and/or sections thereof with reduced exposure to the content and/or emotional content. For example, the reduced impact viewing may facilitate the reviewer marking 334 sections and/or characters that need further study (for example with respect to details listed below) without viewing the entire media in full impact. Optionally, faces may be masked to reduce the emotional human impact of the media. When necessary to judge expressions, the faces may be viewed (e.g., with the rest of the content revealed and/or with all or some of the other content masked). In some embodiments, skin is treated differently from other parts of an image. For example, skin may be masked while the rest of an image is not masked, other parts of the image may be masked while skin is not masked and/or skin may be masked in one way while other parts of the image are masked in a different way.

In some embodiments, marking 334 may include what needs to be determined and/or correlations 336 to other sections of the media. For example, scenes including one character (e.g., a minor) and/or two characters (e.g., a minor and a significant adult) may be marked 334 for review and/or correlations 336 between various factors (erotic content and the presence of certain characters and/or erotic content and violence and/or violence and certain characters and/or nudity and the presence of certain characters may be marked 334). In some cases, changes between scenes may be marked 334 (in this scene the character appears older and/or younger and/or in suggestive clothing etc.).

In some embodiments, either before initial overviewing 330 (e.g., using an automated routine) or after an initial overviewing 330 (e.g., taking into account the reviewer's initial judgement), the media may be summarized (e.g., shortened by removing repetitive and/or non-pertinent material). Optionally, low information sections (for example where there is low entropy) may be removed. For example, a video may be reduced by reducing the time resolution e.g., keeping just the key frames and/or reducing the number of key frames. For example, markings and/or automated content recognition may be used to find pertinent images, sounds and/or data in the video. In some embodiments, summarizing may have one or more advantages, such as reducing the impact of the disturbing content (making it choppy and/or less engaging), shortening exposure of reviewers to the material, reducing the computational burden of the routines for masking (optionally this may facilitate using more sophisticated tools for reducing impact) and/or reducing impact by showing only pertinent 338 material.

In some embodiments, index items may be generated automatically. For example, a routine may extract text from a media (either text stored as text and/or via Optical Character Recognition in images) and/or add the text (and/or a portion thereof) to an index, for example for use of a reviewer. For example, a voice recognition routine may extract spoken content from a sound track and/or add the content (and/or a portion thereof) to an index of the media. For example, keywords and/or suggestive phrases may be extracted and/or their location marked. Optionally, the system will find and/or mark correlations 336 between sound, text and/or images (for example volume, adult/child/man/woman's voice, volume (e.g., signs of violence), skin, blood etc.). Optionally, the system may flag and/or give grades to a media item and/or a portion thereof for the presence of various signs of particular content (e.g., pornography, violence, pedophilia etc.).

Figure 4:
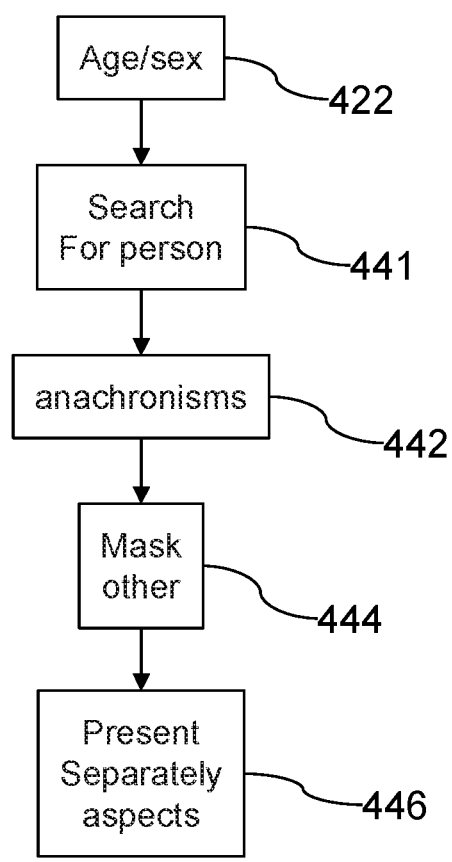
FIG. 4 is an illustration of facilitating determine the gender, age and/or sexual characteristics of a character in a media in accordance with and embodiment of the current invention.

FIG. 4 is an illustration of facilitating determine the gender, age and/or sexual characteristics of a character in a media in accordance with and embodiment of the current invention. In some cases, reviewing a media may require determine if erotic images include a minor and/or a person portrayed as a minor. In some embodiments, a system for reviewing media may include tools to help determine the age 422 and/or apparent age 422 of a character. For example, the tools may help the reviewer collect up and/or compare images from various portions of the media depicting a single character 441. For example, the tools may find anachronistic 442 points in the presentation. For example, when the apparent age of the face and body are not the same and/or when an apparent age and/or gender and/or sexual characteristics of a character appear to differ in different scenes (for example, the apparent age in erotic scenes in less than the apparent age in other story scenes, for example, in some scenes the character acts and/or speaks like a minor and in other scenes s/he is involved in actions and/or speech inappropriate to that age). For example, the system may determine relative sizes of limbs and organs of a character (a mature adult may have a smaller head relative to the trunk and/or legs and/or a relatively smaller trunk compared to the legs). For example, the relative size of the hips and/or trunk and/or chest may be tracked. Changes in apparent ratios of fat muscle etc. may be tracked. In some case apparent disagreement between age of a face vs. the age of a body may be flagged and/or depicted. This may help clarify the age of characters more easily and/or with reduced exposure to disturbing content. During a given task (e.g., estimating age 422, analyzing the role of a single character 441, anachronisms 442 etc.), Parts of the media that are not relevant to the current task may be masked 444. This may decrease the impact of reviewing media by facilitating determining apparent age (one of the more time-consuming portions of reviewing) with reduced exposure to disturbing content. Optionally, the system will include tools for tracking results separately 446 of each part of the analysis and/or tracking a probability and/or doubt in the determination and/or left-over tasks to finish that part of the analysis. This may make it possible for a user to return to a task with less need to recall where he was by reviewing previously viewed material.

Figure 5:
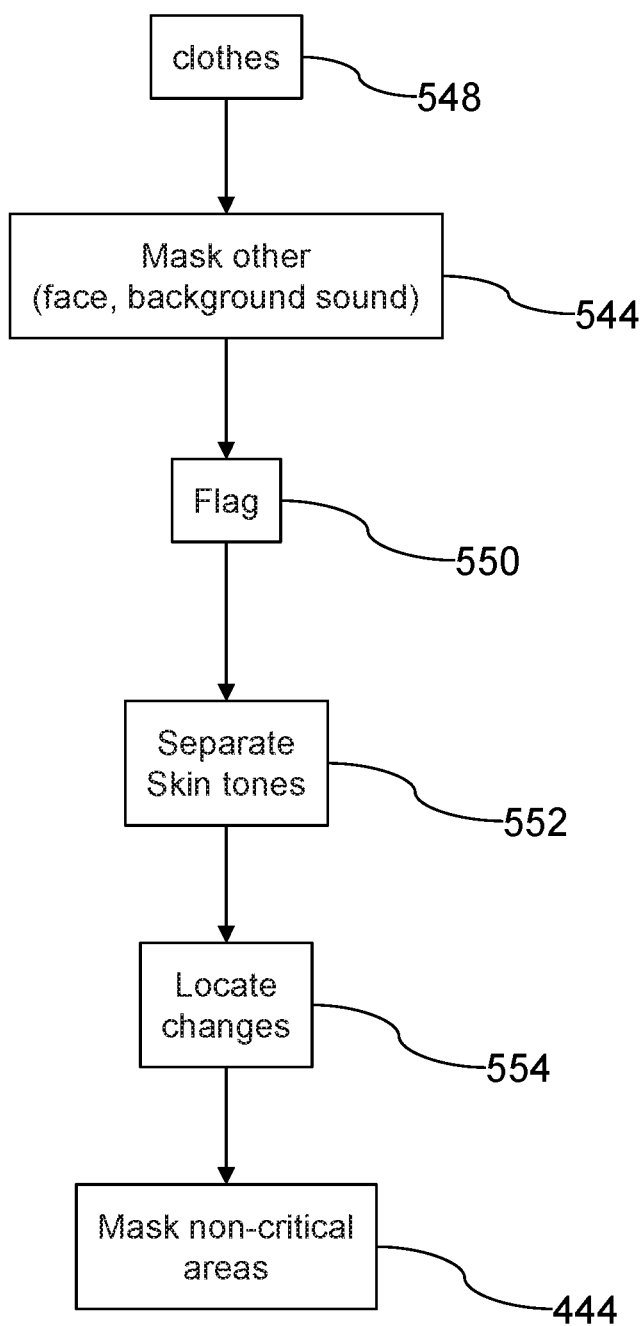
FIG. 5 illustrates a method for facilitating reviewing of clothing with reduced impact of the reviewer in accordance with an embodiment of the current invention.

FIG. 5 illustrates a method for facilitating reviewing of clothing with reduced impact of the reviewer in accordance with an embodiment of the current invention. In some embodiments, the system may isolate images included the desired object (e.g., clothing 548) of a certain character). Locations which are not pertinent to the current analysis (for example, facial expressions, background of the scene, etc. which in some cases may include disturbing material) are optionally masked 544. For example, a system may separate 552 skin tones from clothing and/or flag 550 where the difference between clothes and skin is ambiguous. In some embodiments, important locations to analyze to determine what is the nature of the subject matter may be flagged 550. For example, the system may flag 550 boundaries where skin or body parts are revealed under clothing and/or at breaks in clothing. For example, the system may flag 550 locations where exposure is increasing and/or decreasing. For example, flagging 550 may include putting a marker in the image and/or changing a characteristic (e.g., color and/or brightness of the flagged 550 area and/or of non-flagged areas). Flagging 550 may help the user concentrate on particular areas, reducing exposure to other areas and/or flagging 550 may make the picture less real and reduce its emotional impact. In some embodiments, the system may help the user locate 554 area of interest, for example, where an anachronistic change occurs, for example clothing ripping and/or being moved and/or changing its shape and/or becoming more revealing.

Figure 6:
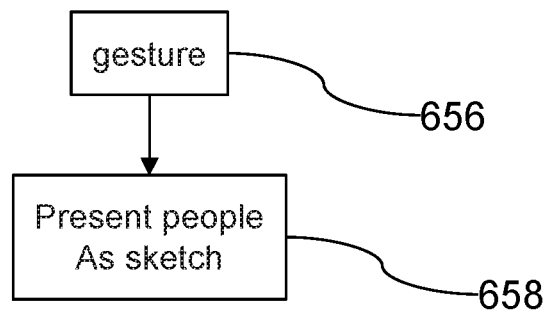
FIG. 6 illustrates reducing an impact of a media while facilitating reviewing of expressions, pose and/or gestures 656 in accordance with an embodiment of the current invention.

FIG. 6 illustrates reducing an impact of a media while facilitating reviewing of expressions, pose and/or gestures 656 in accordance with an embodiment of the current invention. Optionally, people may be presented as a caricature and/or in some unreal way (e.g., a sketch 658 and/or an outline). This may facilitate recognizing lewd, threatening, violent and/or suggested gestures and/or poses with reduced impact on the reviewer.

Figure 7:
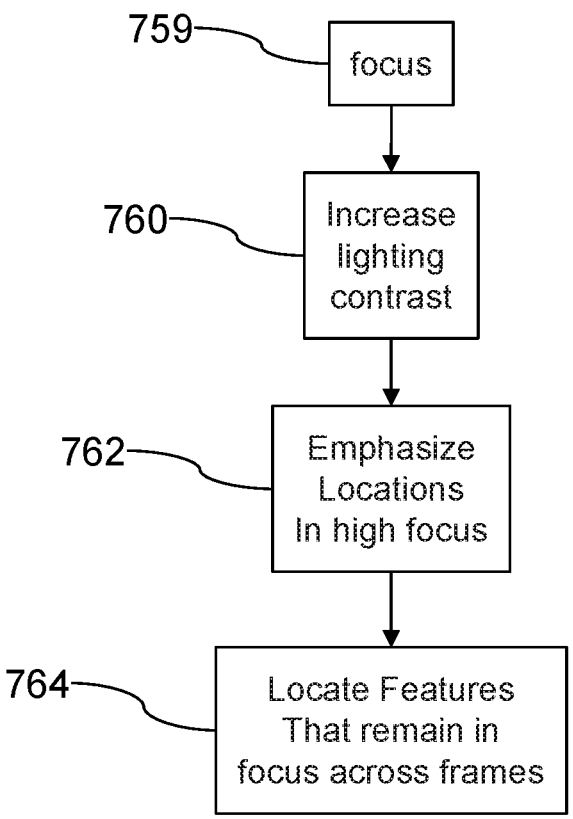
FIG. 7 is an illustration of facilitating evaluation of disturbing subject matter in a media with reduced exposure by emphasizing the focus of the media in accordance with an embodiment of the current invention.

FIG. 7 is an illustration of facilitating evaluation of disturbing subject matter in a media with reduced exposure by emphasizing the focus 759 of the media in accordance with an embodiment of the current invention. In some embodiments, a media may include sections having a mixture of subject matter. For example, there may be many secondary portions that increase the impact of the focus 759 of the media. Optionally, a system for facilitating reviewing of media with reduced impact may include a function for viewing a portion on which the media is focused 759 while masking other parts of the media. For example, the contrast of lighting may be increased 760 making the portion of an image that is in well lit easy to see and/or masking areas that are overlit and/or underlit. For example, a routine (e.g., a routine emphasizing areas of high entropy) may emphasize 762 areas of focus of an image and mask blurry and/or less well focused areas. For example, a routine may emphasize 764 focus and/or highlight areas that remains in a moving image across frames and/or mask areas that are changing from frame to frame. For example, emphasizing 764 the focus 759 of a media may help determine whether an image of a minor is intended to give an erotic message and/or part of a legitimate story line. For example, emphasizing the focus 759 of an image may allow more quickly determining the main content of the media without being exposed to a lot of disturbing secondary images.

Figure 8:
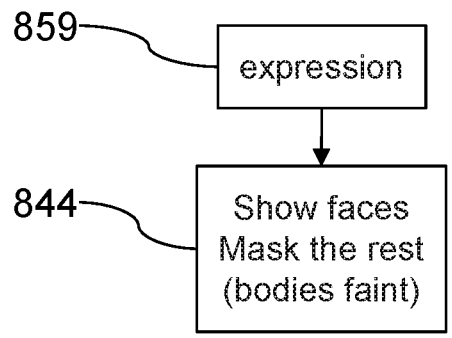
FIG. 8 illustrates a method for reviewing facial expressions with reduced impact on a viewer in accordance with an embodiment of the current invention.

FIG. 8 illustrates a method for reviewing facial expressions 859 with reduced impact on a viewer in accordance with an embodiment of the current invention. For example, a system may mask 844 a background and/or a body of a character while showing his face. For example, this may help determine painful and/or erotic sections without being exposed to the full impact of the violence, pedophilia and/or pornography being portrayed.

Figure 9:
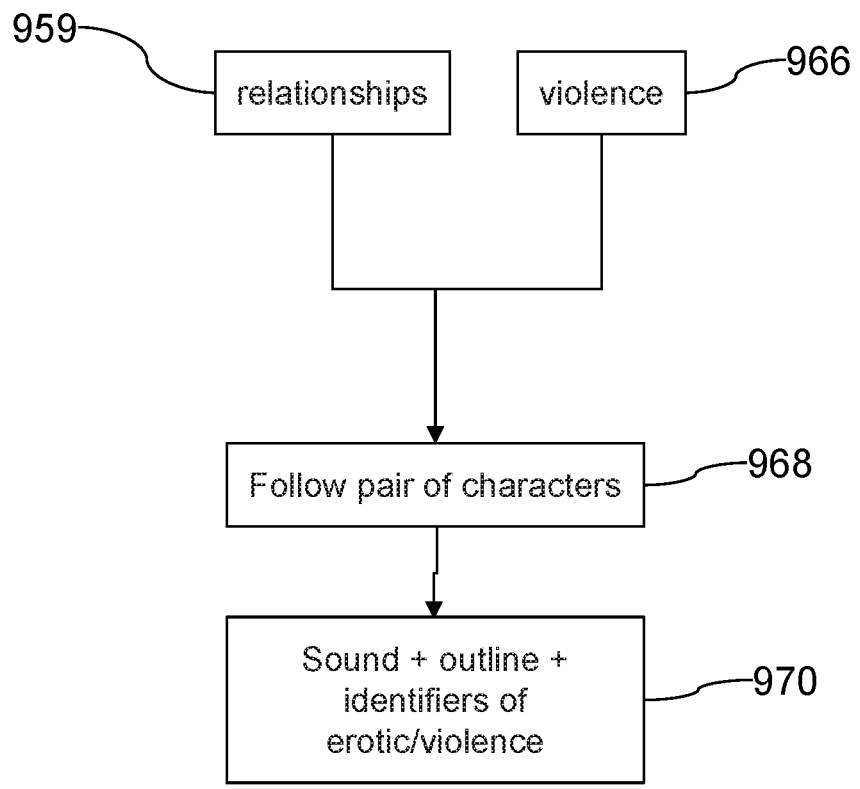
FIG. 9 is an illustration of determining correlations and/or large-scale tendencies within a media in accordance with an embodiment of the current invention.

FIG. 9 is an illustration of determining correlations and/or large-scale tendencies within a media in accordance with an embodiment of the current invention. For example, a framework and/or summary of a media may be generated. Optionally, correlations may be identified (e.g., either automatically and/or by human analysis and/or using statistics) between various aspects of a media. For example, as described herein in various sections correlations between different kinds of objectionable content and/or correlations between content and particular characters and/or correlations between content and focus of a scene. In some embodiments, a general tendency of the media may be identified (e.g., younger/more passive characters with ambiguous age and/or sexual characteristic are more likely to be involved in graphic erotic scenes and/or violence). For example, correlations between happy, loud and/or exiting sounds with erotic and/or violent scenes may be identified.

In some embodiments, one or more relationships 959 between characters may be mapped. For example, correlation between certain characters and violent 966. Optionally, scenes with a pair of characters (e.g., a dominant adult and a child) may be followed 968 and rated (e.g., for sounds, images, words) that are identified 970 with violence and/or erotic material.

Figure 10:
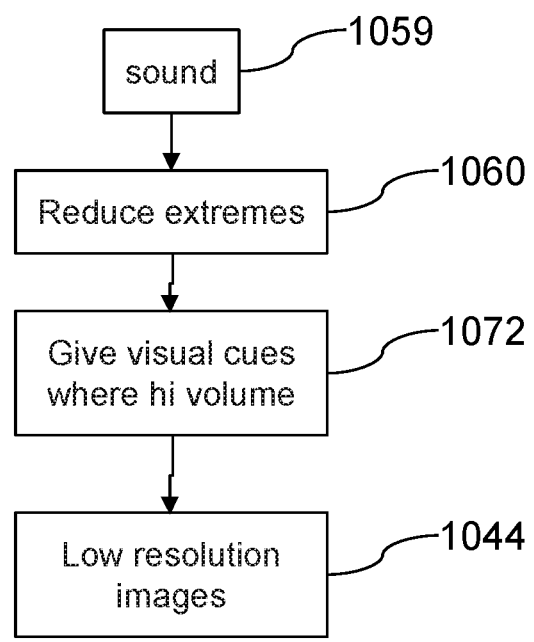
FIG. 10 is an illustration of modifying sound in a media in accordance with an embodiment of the current invention.

FIG. 10 is an illustration of modifying sound 1059 in a media in accordance with an embodiment of the current invention. A sign of the real volume (for example, volume bars may be shown 1072). In some embodiments the contrast of sounds may be reduced 1060 (e.g., volume of loud sounds may be reduced and/or soft sounds may be amplified). Optionally, the correlation of sound and video content will be presented with reduced emotional impact on the viewer. For example, the sounds may be muffled and/or resolution may be reduced and/or a modified image may be shown and/or masked 1044 when sound is being played and/or sound and video content may be classified separately and/or the correlations between classified sections may be analyzed.

Figure 11:
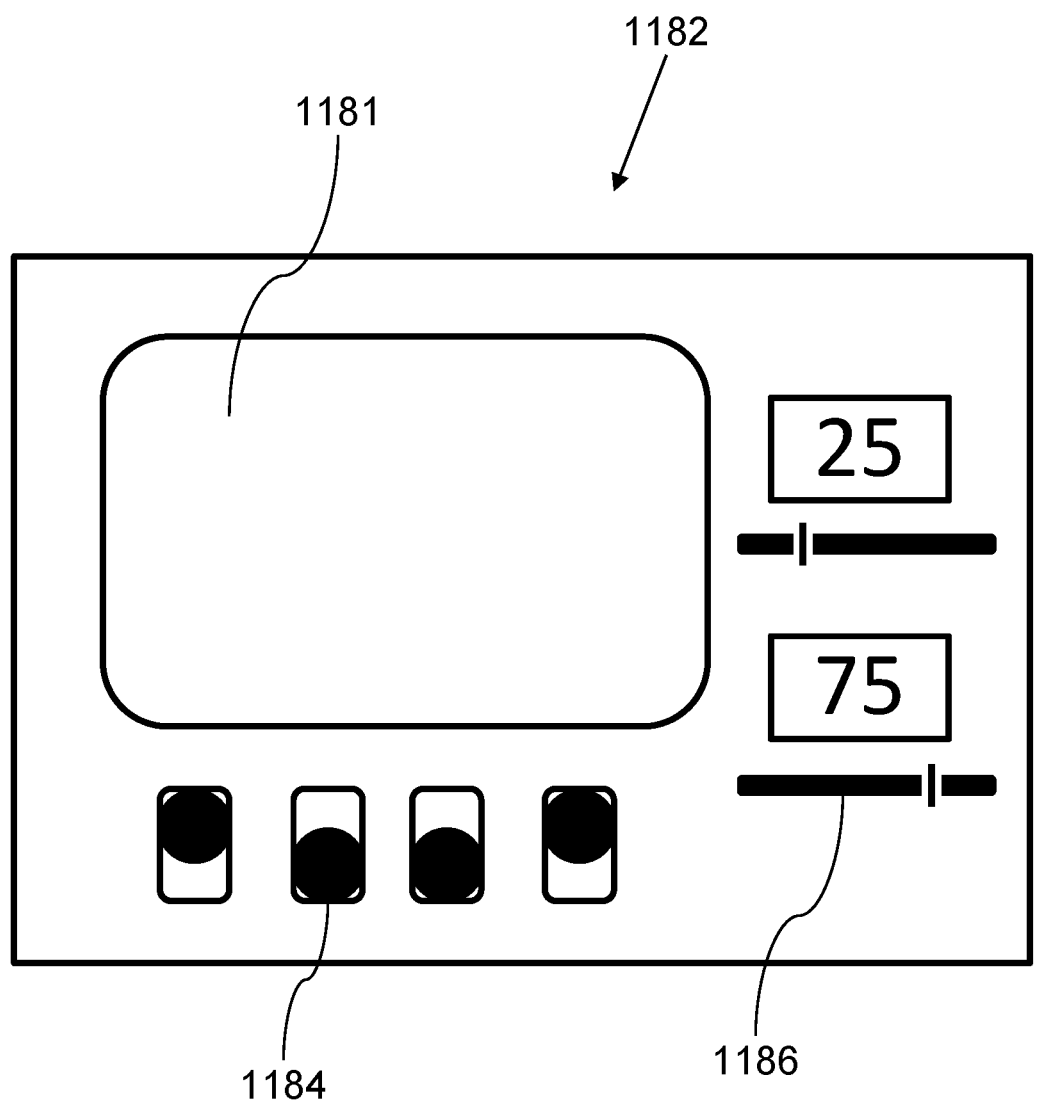
FIG. 11 illustrates an image window in a control frame in accordance with an embodiment of the current invention.

FIG. 11 illustrates an image window 1181 in a control frame in accordance with an embodiment of the current invention. In some embodiments, the system is designed to inhibit full screen images and/or video viewing. For example, videos may be presented in a frame and/or as a window 1181 in a dashboard 1182 (e.g., including controls such as toggle switches 1184 and/or sliders 1186 which are used to control various aspects of the playback and/or adjustments of the viewer and/or modes of the application giving the user a feeling that he is controlling a technical process and/or discouraging the feeling that he is viewing a scene and/or discouraging the feeling that he is inside the scene).

Figure 12:
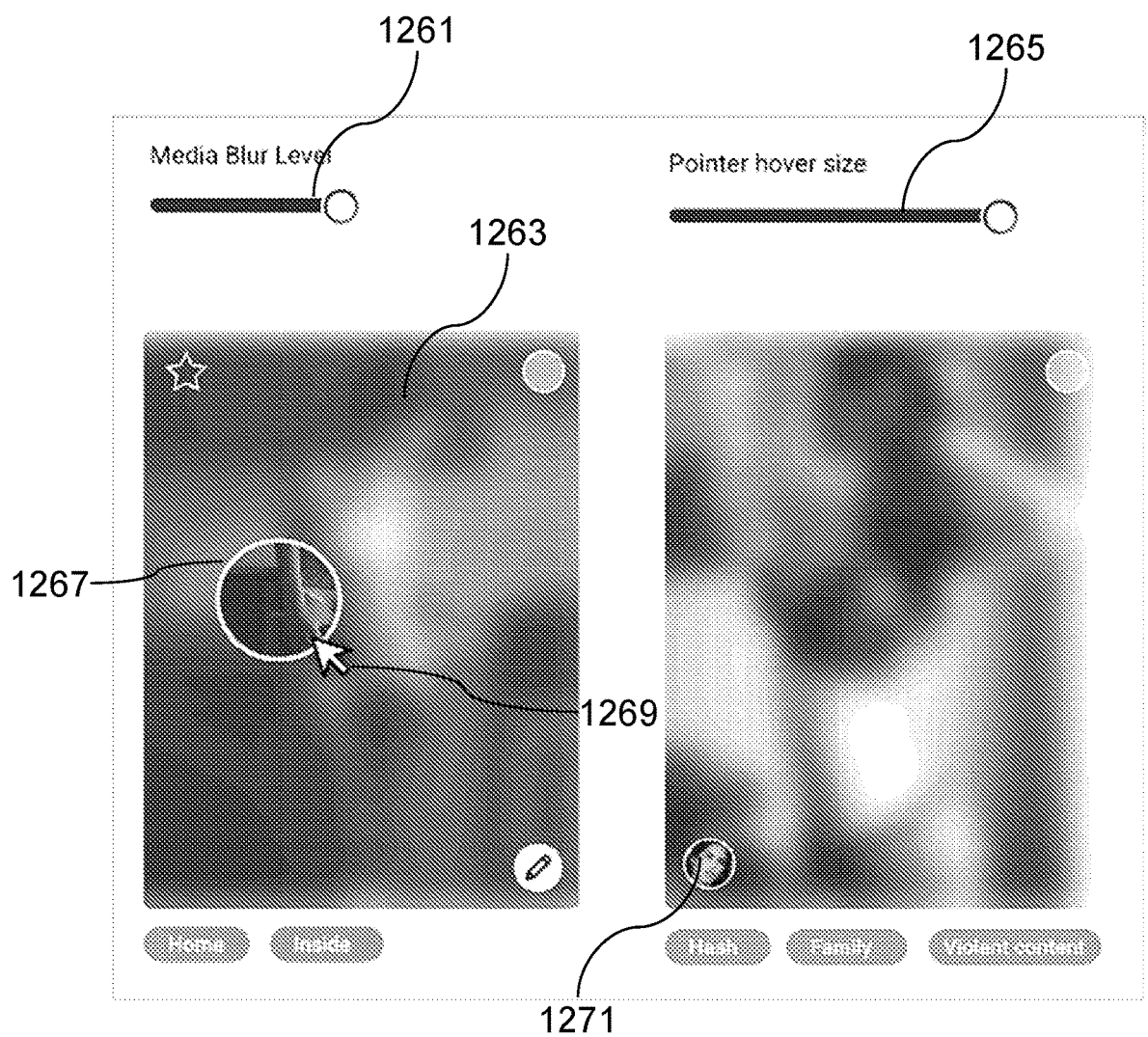
FIG. 12 is a screen shot illustration of reviewing a portion of an image in accordance with an embodiment of the current invention.

FIG. 12 is a screen shot illustration of reviewing a portion of an image in accordance with an embodiment of the current invention. In some embodiments, an interface for investigating pedophilia will include functions to view significant details in an image without being exposed to the full emotional effects of the image. For example, there may be a control 1261 a user may control a level of blur 1263 in an image. Optionally there may be one or more controlled focus regions 1267 in the image (e.g., having reduced and/or increase blur and/or magnification). For example, each focus region 1267 may include a window where content can be viewed with reduced and/or no blur. Optionally the window can be moved around the image (for example using a pointing device 1269 for example a mouse). Optionally there may be a control 1265 of window attributes. For example, a focus region 1267 may be made different shapes or sizes. Optionally, the level of blur of the picture will be adjusted to allow navigation and/or find parts of the image (e.g., to follow a detail in a moving image across frames) while not seeing emotionally significant details that are not pertinent to the current viewing. Optionally, multiple levels of blur and clarity may be automatically and/or manually controlled and/or positioned on an image. Additionally or alternatively, there may be automated tracking and/or marking of parts of an image. For example, an object may be automatically tracked (e.g., a face and/or a sexual organ and/or a weapon) and/or a focus region (increased or decreased focus) may be attached to the object and/or automatically follow the object. For example, a picture 1271 of the face of the currently viewed subject may be displayed on another place in the display (facilitating the investigator to have awareness of which character he is viewing without as much emotional association between the emotional details (e.g., the organs in a focus region 1267, sex or violence) and the individual (e.g., the face). For example, a search function may find and/or classify where a certain character appears, where s/he appears in sexual and/or violent context, where parts of his/her body are exposed etc. Various aspects of the character (what parts are exposed, violence, signs of maturity etc. may be classified and/or correlated allowing a user to identify correlations). Automatic text and/or audio analysis may also find and/or identify verbal, audio and/or textual signs (e.g., loud breathing, loud sounds, anguished cries, threatening words, threatening sounds etc.). The audio signs and/or aspects of the images may be correlated. In some embodiments, searching may include looking for similar location, background, metadata (e.g., date, evidence that the media was produced by the same equipment and/or artisan and/or classification within a storage device and/or recorded usage and/or recorded sharing and/or image quality etc. Searching and/or classification may also be controlled by specifying details, people, objects, categories, labels etc. that should excluded from the search.

Optionally, the system will include indexing, searching and/or tracking functions. For example, the system may search for and/or track an individual through a video and/or through different media on a storage device (for example a confiscated hard drive). Optionally, the user will be able to find and/or label various details and/or people. Optionally, the system may automatically track certain actions (e.g., likely violence, sexuality etc.) and/or the user may mark such actions. In some embodiments, the system will track details of the object (e.g., character) such as an estimated age, marks on the body, signs of maturity, signs of trauma. For example, a user may be able to identify inconsistencies in representation of the character. For example, the user may be able to identify if a bruise and/or a scar that appears after a violent scene is real (e.g., the result of real violence whose results can be identified in later images that are not related thematically to the violent scene and/or simulated). All of this will help a user identify and/or collect evidence of criminal activities (e.g., abuse, pedophilia). Optionally, automated search and/or classification and/or identification of characters and/or actions will facilitate quick collection of evidence speeding investigations. For example, being able to collect evidence quickly may facilitate capturing perpetrators and/or data before they are able to escape investigators.

Figure 13:
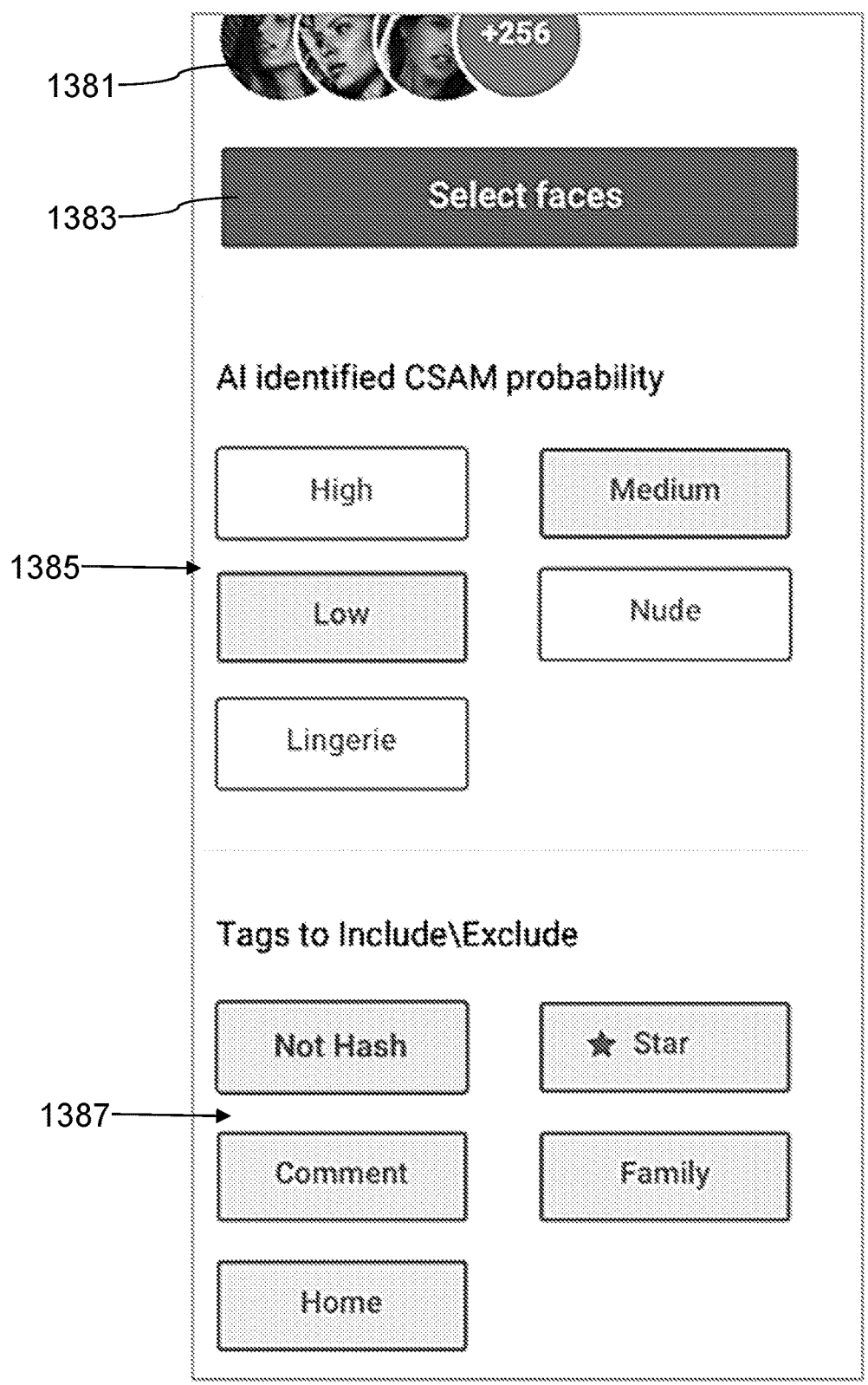
FIG. 13 is a screen shot illustration of a menu for searching for pedophilic material in accordance with an embodiment of the current invention.

FIG. 13 is a screen shot illustration of a menu for searching for pedophilic material in accordance with an embodiment of the current invention. Under some circumstances, investigators using conventional methodologies rely on hash identification and sort through seized media manually, which can take days thus routinely jeopardizing the arrest and/or risking the perpetrators destroying additional evidence before the investigator and finds and seize it. Occasionally in cases where the suspect is known to engage in pedophilia, the slow rate of evidence collection allows the suspect to escape before a warrant can be attained for his arrest and/or to seize important evidence.

Some embodiments may combine automated searching, automated identification (e.g., of individuals, characteristics [e.g., maturity, scars, body marks, exposure of body parts] and/or actions e.g., violence, sexuality, etc.), correlation and/or manual automated searching, automated identification and/or artificial intelligence (e.g., using manual identifications to further train automated routines). Optionally, this will help an investigator to understand context without reduced exposure to the image. Optionally, this will help an investigator to collect sufficient evidence with reduced exposure to the material. Optionally, the system will include tools to organize and/or package data for presentation to courts. In some embodiments, the system may reduce the time that an investigator is exposed to material while packaging it for presentation and/or reduce time to get legal actions (e.g., warrants, protection orders etc.).

In some embodiments, a user may have various search options. For example, characters may be identified by images (e.g., faces 1381) and/or a search may be made for images of the character. Controls 1383 may be presented on a control panel for controlling the search. For example, the user may use controls 1385 to specify objects and/or subjects and/or actions for which to search and/or the user may control the specificity and/or probability of false positive and/or missing examples (false negative). Optionally, the user may index, classify and/or search for and/or view and/or classify and/or correlate tagged material 1387 according to manual and/or automatic classifications.

It is expected that during the life of a patent maturing from this application many relevant technologies will be developed and the scope of the terms is intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for protecting a viewer comprising
searching a seized media for distressing content,
presenting a portion of the distressing content to the viewer as part of a legal investigation,
masking temporarily the distressing content in the portion being presented by default,
providing a user interface facilitating the viewer
reducing a level of said masking of said portion to facilitate identifying said distressing content while preserving a reduced emotional impact, and
removing all masking on said portion to facilitate legal testimony on said distressing content.

2. The method of claim 1, wherein said making includes reducing a resolution of the media and said reducing a level of said masking includes increasing a resolution of said portion.

3. The method of claim 1, further comprising:
classifying automatically said distressing content,
presenting an index of said distressing content to said viewer, and
providing an automatic function to estimate an age of a person in an image and wherein said classifying includes indexing distressing content including an underage person and wherein said presenting includes presenting said distressing content including said underage person.

4. The method of claim 1, further comprising:
providing an automatic function to identify an anachronistic aspect of an image and wherein said presenting includes said anachronistic aspect.

5. The method of claim 4, wherein said anachronistic aspect includes a body organ that is out of scale with relation to other parts of a body.

6. The method of claim 4, wherein said anachronistic aspect includes a change in a person in different portions of the media.

7. The method of claim 1, further comprising:
providing an automatic function to mask everything except a relationship between a pair of persons in the media.

8. The method of claim 1, further comprising:
providing an automatic function to mask details not flagged as ambiguous in the media.

9. The method of claim 1, further comprising:
providing an automatic function to mask details flagged as already identified in the media.

10. The method of claim 1, where said reducing a level of said masking includes at least one of changing a color of the portion, presenting the portion in black and white, increasing contrast of the portion, decreasing contrast, of the portion, presenting the portion as an outline, increasing resolution of the portion, cropping in space, cropping in time.

11. The method of claim 1, further comprising:
providing an automatic function to mask nudity.

12. The method of claim 1, further comprising:
providing an automatic function to mask everything except nudity.

13. The method of claim 1, further comprising:
providing an automatic function to mask expressions of distress.

14. The method of claim 1, further comprising:
providing an automatic function to mask everything except expressions of distress.

15. The method of claim 1, further comprising:
providing an interface for classifying portions of the media.

16. The method of claim 15, further comprising:
wherein said classifying includes a category for distressing content, dangerous content, violence, erotic content, pedophilia, ambiguous, need to review.

17. The method of claim 1, further comprising:
providing an interface for automatically presenting portions of the media that relate to an age on one or more people.

18. The method of claim 1, wherein skin is masked differently from other portions of the media.

19. The method of claim 1, wherein children are masked differently from other people.

20. The method of claim 1, wherein said identifying is of an evidence of criminal activity.

21. The method of claim 1, further comprising:
classifying automatically said distressing content;
presenting an index of said distressing content to said viewer; and
selecting said portion from said index for said viewing.

22. The method of claim 21, further comprising masking distressing portions not identified as pertinent to the legal testimony during said presenting of the pertinent portion.

23. The method of claim 1, wherein said user interface is configured for returning said masking after said reducing a level of said masking.

24. The method of claim 23, wherein said returning is in response to at least one of said viewer moving a pointing device and said viewer letting go of a selection switch.

* * * * *